United States Patent
Day et al.

(10) Patent No.: US 7,416,627 B2
(45) Date of Patent: Aug. 26, 2008

(54) FILMS AND FILM LAMINATES HAVING CUSHIONING CELLS AND PROCESSES OF MAKING THEREOF

(75) Inventors: Bryon Paul Day, Canton, GA (US); Ann Louise McCormack, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 161 days.

(21) Appl. No.: 11/216,911

(22) Filed: Aug. 31, 2005

(65) Prior Publication Data

US 2007/0045903 A1   Mar. 1, 2007

(51) Int. Cl.
*B32B 37/00* (2006.01)

(52) U.S. Cl. .................. 156/244.11; 156/145

(58) Field of Classification Search ............ 156/244.11, 156/145
See application file for complete search history.

(56) References Cited

U.S. PATENT DOCUMENTS

| | | | |
|---|---|---|---|
| 3,094,449 A * | 6/1963 | Sisson ................. 156/184 |
| 3,354,506 A | 11/1967 | Raley |
| 3,423,266 A | 1/1969 | Davies et al. |
| 3,468,311 A | 9/1969 | Gallagher |
| 3,595,731 A | 7/1971 | Davies et al. |
| 3,645,264 A | 2/1972 | Gallagher |
| 3,650,649 A | 3/1972 | Schippers |
| 3,692,618 A | 9/1972 | Dorschner et al. |
| 3,801,429 A | 4/1974 | Schrenk et al. |
| 3,802,817 A | 4/1974 | Matsuki et al. |
| 3,812,001 A | 5/1974 | Ryan |
| 3,849,241 A | 11/1974 | Butin et al. |
| 3,855,046 A | 12/1974 | Hansen et al. |
| 3,868,285 A | 2/1975 | Troy |
| 3,908,659 A | 9/1975 | Wehrmeyer et al. |
| 4,041,203 A | 8/1977 | Brock et al. |
| 4,076,872 A | 2/1978 | Lewicki et al. |
| 4,340,563 A | 7/1982 | Appel et al. |
| 4,417,936 A * | 11/1983 | Gaffney ................. 156/145 |
| 4,488,928 A | 12/1984 | Ali Khan et al. |
| 4,564,407 A | 1/1986 | Tsuruta |

(Continued)

FOREIGN PATENT DOCUMENTS

EP 0701954 A1 3/1996

(Continued)

OTHER PUBLICATIONS

Kirk-Othmer Encyclopedia of Chemical Technology, 4 Ed. John Wiley & Sons, New York, 1993, vol. 10, pp. 777-778.*

(Continued)

*Primary Examiner*—Jeff H Aftergut
(74) *Attorney, Agent, or Firm*—Richard M. Shane

(57) ABSTRACT

Disclosed herein is a cushioned blown film including a first blown film layer, a second blown film layer, and a plurality of cushioning cells defined between the first blown film layer and the second film layer. The cushioned blown films may be bonded to a fibrous web to make film nonwoven laminates. Processes for making the cushioned blown film and the film nonwoven laminates are also disclosed. Such laminates are highly useful for use in personal care products, protective wear garments, medical care products, mortuary and veterinary products and the like.

13 Claims, 4 Drawing Sheets

U.S. PATENT DOCUMENTS

| | | | |
|---|---|---|---|
| 4,643,727 | A | 2/1987 | Rosembaum |
| 4,714,506 | A | 12/1987 | Yamashiro et al. |
| 4,723,953 | A | 2/1988 | Rosenbaum et al. |
| 4,766,029 | A | 8/1988 | Brock et al. |
| 4,962,769 | A | 10/1990 | Garcia |
| 4,965,122 | A | 10/1990 | Morman |
| 4,981,747 | A | 1/1991 | Morman |
| 5,108,820 | A | 4/1992 | Kaneko et al. |
| 5,152,023 | A | 10/1992 | Graebe |
| 5,169,706 | A | 12/1992 | Collier, IV et al. |
| 5,226,992 | A | 7/1993 | Morman |
| 5,272,236 | A | 12/1993 | Lai et al. |
| 5,273,361 | A * | 12/1993 | Jillson .................. 383/93 |
| 5,278,272 | A | 1/1994 | Lai et al. |
| 5,330,459 | A | 7/1994 | Lavon et al. |
| 5,332,613 | A | 7/1994 | Taylor et al. |
| 5,336,545 | A | 8/1994 | Morman |
| 5,336,552 | A | 8/1994 | Strack et al. |
| 5,364,339 | A | 11/1994 | Carver |
| 5,382,400 | A | 1/1995 | Pike et al. |
| 5,462,519 | A | 10/1995 | Carver |
| 5,464,688 | A | 11/1995 | Timmons et al. |
| 5,520,674 | A | 5/1996 | Lavon et al. |
| 5,539,056 | A | 7/1996 | Yang et al. |
| 5,582,604 | A | 12/1996 | Ahr et al. |
| 5,596,052 | A | 1/1997 | Resconi et al. |
| 5,620,779 | A | 4/1997 | Levy et al. |
| 5,643,241 | A | 7/1997 | Ahr et al. |
| 5,707,468 | A | 1/1998 | Arnold et al. |
| 5,769,834 | A | 6/1998 | Reiter et al. |
| 5,789,065 | A * | 8/1998 | Haffner et al. .............. 428/152 |
| 5,851,936 | A * | 12/1998 | Marshall .................... 442/334 |
| 5,858,515 | A | 1/1999 | Stokes et al. |
| 5,876,393 | A | 3/1999 | Ahr et al. |
| 5,906,703 | A | 5/1999 | Kriesel |
| 5,962,112 | A | 10/1999 | Haynes et al. |
| 6,146,368 | A | 11/2000 | LaPointe |
| 6,180,847 | B1 | 1/2001 | Ahr et al. |
| 6,423,045 | B1 | 7/2002 | Wise et al. |
| 6,428,522 | B1 | 8/2002 | DiPalma et al. |
| 6,446,691 | B1 | 9/2002 | Maldonado et al. |
| 6,458,110 | B1 | 10/2002 | Lavon et al. |
| 6,610,163 | B1 | 8/2003 | Mathis |
| 6,619,947 | B2 | 9/2003 | Maldonado et al. |
| 6,632,386 | B2 | 10/2003 | Shelley et al. |
| 6,666,850 | B1 | 12/2003 | Ahr et al. |
| 6,673,982 | B1 | 1/2004 | Chen et al. |
| D493,886 | S | 8/2004 | Vernoy |
| 6,817,991 | B1 | 11/2004 | Jabalee |
| 6,824,734 | B2 | 11/2004 | Boggs et al. |
| 6,852,102 | B1 | 2/2005 | Vernoy |
| 6,855,424 | B1 | 2/2005 | Thomas et al. |

FOREIGN PATENT DOCUMENTS

| | | | |
|---|---|---|---|
| EP | 964949 B1 * | 11/2001 | |
| EP | 1281633 A1 | 2/2003 | |
| EP | 1422056 A1 | 5/2004 | |
| GB | 2344993 | 6/2000 | |
| JP | 10-28697 A * | 2/1998 | |
| JP | 2001-61892 A * | 3/2001 | |
| WO | WO 98/08473 | 3/1998 | |
| WO | WO 01/35889 | 5/2001 | |

OTHER PUBLICATIONS

ASTM Designation: E 96-80, "Standard Test Methods for Water Vapor Transmission of Materials", Published Feb. 1981, pp. 87-96.

"Film Blowing," PolymerProcessing.com, Information Page, viewed and printed Jul. 29, 2005.

* cited by examiner

FILMS AND FILM LAMINATES HAVING CUSHIONING CELLS AND PROCESSES OF MAKING THEREOF

BACKGROUND OF THE INVENTION

Many of the medical care products, protective wear garments, personal care products, and veterinary products, and in use today are available as disposable products. By disposable, it is meant that the product is used only a few times, or even only once, before being discarded. Examples of such products include, but are not limited to, medical and health care products such as surgical drapes, gowns and bandages, protective workwear garments such as coveralls and lab coats, and infant, child and adult personal care absorbent products such as diapers, training pants, incontinence garments and pads, sanitary napkins, wipes and the like. Despite the disposability of these products, comfort is an important feature for these products to provide.

Fibrous nonwoven webs formed by extrusion processes such as spunbonding and meltblowing, and by mechanical dry-forming process such as air-laying and carding, used in combination with thermoplastic film or microfiber layers, may be utilized as components of these disposable products since their manufacture is often inexpensive relative to the cost of woven or knitted components. A layer of film or microfibers may be used to impart liquid barrier properties, and an elastic layer (elastic film or elastic microfibers, for example) may be used to impart additional properties of stretch and recovery. However, films in general and elastic layers in particular, whether a film sheet layer or a microfiber layer, often have unpleasant tactile aesthetic properties, such as feeling rubbery or tacky to the touch, making them unpleasant and uncomfortable against the wearer's skin. Fibrous nonwoven webs, on the other hand, have better tactile, comfort and aesthetic properties.

The tactile aesthetic properties of elastic films can be improved by forming a laminate of an elastic film with one or more non-elastic materials, such as fibrous nonwoven webs, on the outer surface of the elastic material. However, fibrous nonwoven webs formed from non-elastic polymers such as, for example, polyolefins are generally considered non-elastic and may have poor extensibility, and when non-elastic nonwoven webs are laminated to elastic materials the resulting laminate may also be restricted in its elastic properties. Therefore, laminates of elastic materials with nonwoven webs have been developed wherein the nonwoven webs are made extensible by processes such as necking or gathering.

Materials that provide improved comfort at a price attractive for single use products remain a sought-after goal. In particular, there remains a need for cushioned films, cushioned film nonwoven laminate materials and cost-effective and efficient processes of making such materials.

SUMMARY OF THE INVENTION

In one embodiment, a process for forming cushioning elastic laminates including blown film and one or more fibrous nonwoven webs is provided. In one aspect, a process for forming a film nonwoven laminate having cushioning cells includes the steps of extruding a thermoplastic film-forming polymer composition; blowing the extruded thermoplastic polymer composition to form a blown film bubble; directing the bubble to a nip formed between a first roller and a second roller; providing a fibrous nonwoven web; and directing the fibrous nonwoven web between the second roller and the nascent film to form a laminate including the nascent film and the fibrous nonwoven web. The first roller has an outer surface including a continuous pattern of land areas defining a plurality of discrete openings, apertures or holes. Desirably, the second roller includes a smooth outer surface. The first and second rollers partially collapse the bubble into a nascent film sheet including a first film layer, a second film layer, and a plurality of cushioning cells defined between the first film layer and the second film layer.

In one aspect, the process further includes the step of applying a vacuum to the plurality of discrete openings, apertures or holes. Desirably, the plurality of discrete openings, apertures or holes is in fluid communication with a manifold from which the vacuum is drawn. Such arrangement enhances the uniformity of the vacuum present in the openings, and therefore improves the uniformity of the cushioning cells.

In a further aspect, a gas is blown into the blown film bubble to support the bubble. During formation of the cushioning cells, the film blowing gas is entrained into the cushioning cells. Desirably, the air in the film bubble has an absolute pressure greater than an absolute pressure in the plurality of discrete openings, apertures or holes. Even more desirably, the absolute pressure in the film bubble is greater than the absolute pressure in the plurality of discrete openings, apertures or holes by between about 0.1 and about 5 psi.

The cushioning cells defined between the first and second layers of blown film have an internal gas volume. Desirably, the cushioning cells are discrete cushioning cells having an internal air volume of about 0.0001 to 1.0 cubic centimeters. Even more desirably, the cushioning cells are discrete cushioning cells having an internal air volume of about 0.001 to about 0.1 cubic centimeters.

In embodiments, the process provides for elastic laminates having cross machine direction stretch and recovery, elastic laminates having machine direction stretch and recovery, and elastic laminates having both machine direction and cross machine direction stretch and recovery. The process may further include an additional nip and bonding the laminate in the additional nip by thermal bonding, ultrasonic bonding, or adhesive.

The fibrous nonwoven web or webs may desirably be provided as necked nonwoven webs, or may be incrementally stretched by optionally provided grooved rollers, or may be necked during the lamination process by operating the first nip at a linear velocity greater than the linear velocity at which the fibrous nonwoven web or webs are provided.

Also provided are elastic laminates formed from embodiments of the process of the invention. The laminates may be bilayer laminates including the film sheet and a fibrous nonwoven web on one side of the film, or trilayer laminates including the film sheet and a fibrous nonwoven web on both sides of the film. The laminates may have cross machine direction stretch and recovery, machine direction stretch and recovery, and/or both machine direction and cross machine direction stretch and recovery.

In one embodiment, a process for forming a film having cushioning cells includes extruding a thermoplastic film-forming polymer composition; blowing the extruded thermoplastic polymer composition to form a blown film bubble; and directing the bubble to a nip formed between a first roller and a second roller. The first roller has an outer surface including a continuous pattern of land areas defining a plurality of discrete openings, apertures or holes. The first and second rollers partially collapse the bubble into a nascent film sheet including a first film layer, a second film layer, and a plurality of cushioning cells defined between the first film layer and the second film layer.

In another embodiment, a film having cushioning cells includes a first nascent blown film layer, a second nascent blown film layer, and a plurality of cushioning cells defined between the first film layer and the second film layer.

In a further embodiment, a film nonwoven laminate having cushioning cells includes a nascent blown film sheet including a first film layer, a second film layer, and a plurality of cushioning cells defined between the first film layer and the second film layer; and a fibrous nonwoven web bonded to the nascent film sheet.

DEFINITIONS

Figure 1:
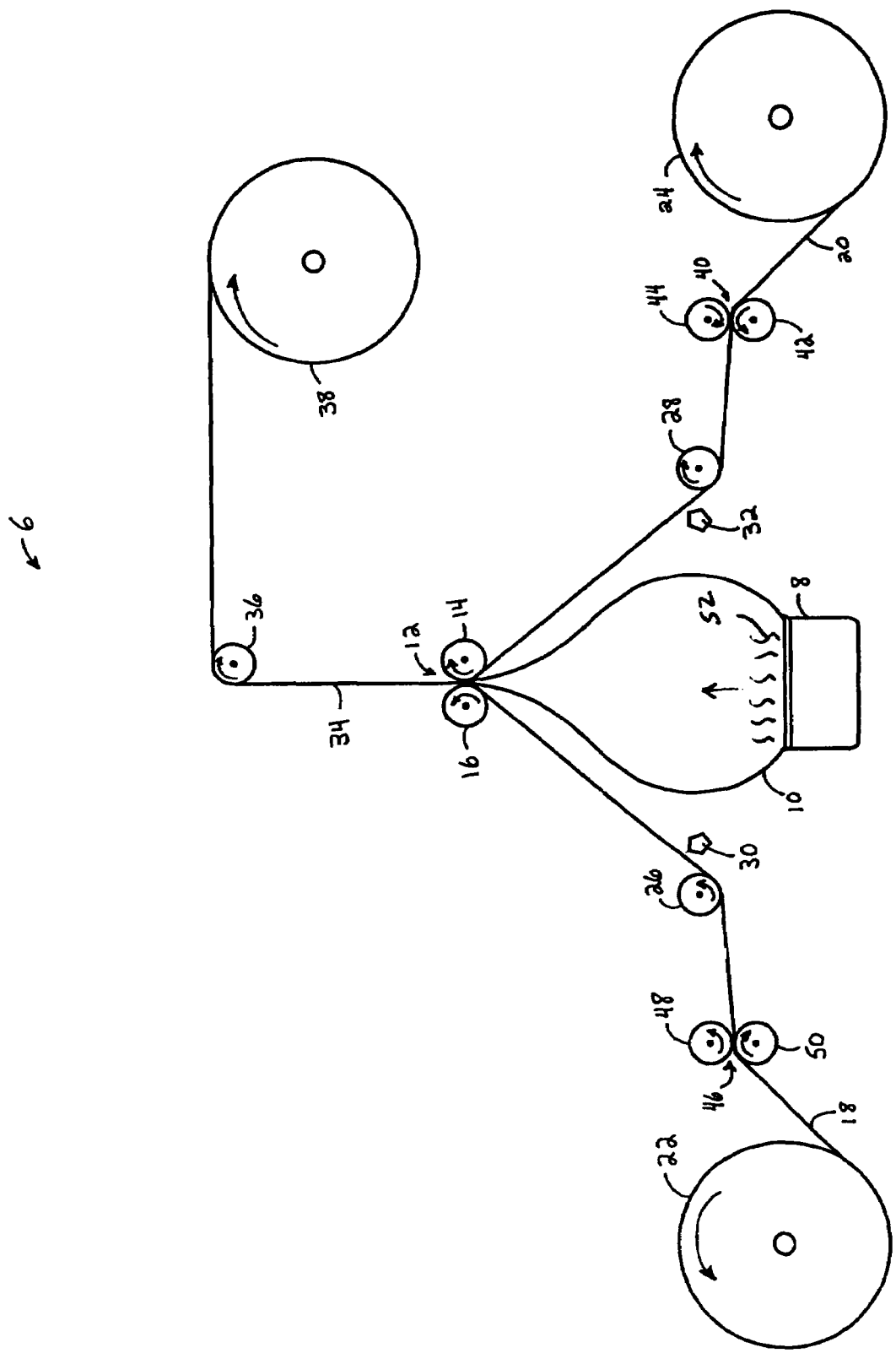
FIG. 1 schematically illustrates a process for forming elastic film nonwoven web laminates according to an embodiment of the invention.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein, the terms "elastic" and "elastomeric" are generally used to refer to a material that, upon application of a force, is stretchable to a stretched, biased length which is at least about 133%, or one and a third times, its relaxed, unstretched length, and which upon release of the stretching, biasing force will recover at least about 50% of its elongation. By way of example only, an elastic material having a relaxed, unstretched length of 10 centimeters may be elongated to at least about 13.3 centimeters by the application of a stretching or biasing force. Upon release of the stretching or biasing force the elastic material will recover to a length of not more than 11.65 centimeters.

As used herein the term "fibers" refers to both staple length fibers and substantially continuous filaments, unless otherwise indicated. As used herein the term "substantially continuous" with respect to a filament or fiber means a filament or fiber having a length much greater than its diameter, for example having a length to diameter ratio in excess of about 15,000 to 1, and desirably in excess of 50,000 to 1.

As used herein the term "monocomponent" filament refers to a filament formed from one or more extruders using only one polymer composition. This is not meant to exclude filaments formed from one polymer to which small amounts of additives have been added for color, anti-static properties, lubrication, hydrophilicity, etc.

As used herein the term "multicomponent filaments" refers to filaments that have been formed from at least two component polymers, or the same polymer with different properties or additives, extruded from separate extruders but spun together to form one filament. Multicomponent filaments are also sometimes referred to as conjugate filaments or bicomponent filaments, although more than two components may be used. The polymers are arranged in substantially constantly positioned distinct zones across the cross-section of the multicomponent filaments and extend continuously along the length of the multicomponent filaments. The configuration of such a multicomponent filament may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section filament, or other configurations. Multicomponent filaments are taught in U.S. Pat. No. 5,108,820 to Kaneko et al. and U.S. Pat. No. 5,336,552 to Strack et al. Conjugate fibers are also taught in U.S. Pat. No. 5,382,400 to Pike et al. and may be used to produced crimp in the fibers by using the differential rates of expansion and contraction of the two (or more) polymers. For two component filaments, the polymers may be present in ratios of 75/25, 50/50, 25/75 or any other desired ratios. In addition, any given component of a multicomponent filament may desirably include two or more polymers as a multiconstituent blend component.

As used herein the terms "biconstituent filament" or "multiconstituent filament" refer to a filament formed from at least two polymers, or the same polymer with different properties or additives, extruded from the same extruder as a blend. Multiconstituent filaments do not have the polymer components arranged in substantially constantly positioned distinct zones across the cross-section of the multicomponent filaments; the polymer components may form fibrils or protofibrils that start and end at random.

As used herein the terms "nonwoven web" or "nonwoven fabric" refer to a web having a structure of individual filaments or filaments that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the filament diameters useful are usually expressed in microns. (Note that to convert from osy to gsm, multiply osy by 33.91).

The terms "spunbond" or "spunbond nonwoven web" refer to a nonwoven fiber or filament material of small diameter filaments that are formed by extruding molten thermoplastic polymer as filaments from a plurality of capillaries of a spinneret. The extruded filaments are cooled while being drawn by an eductive or other well known drawing mechanism. The drawn filaments are deposited or laid onto a forming surface in a generally random manner to form a loosely entangled filament web, and then the laid filament web is subjected to a bonding process to impart physical integrity and dimensional stability. The production of spunbond fabrics is disclosed, for example, in U.S. Pat. Nos. 4,340,563 to Appel et al., U.S. Pat. No. 3,692,618 to Dorschner et al., and U.S. Pat. No. 3,802,817 to Matsuki et al., all incorporated herein by reference in their entireties. Typically, spunbond fibers or filaments have a weight-per-unit-length in excess of about 1 denier and up to about 6 denier or higher, although both finer and heavier spunbond filaments can be produced. In terms of filament diameter, spunbond filaments often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are often smaller than 10 microns in average diameter and are frequently smaller than 7 or even 5 microns in average diameter, and are generally tacky when deposited onto a collecting surface.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that are separated, combed or otherwise treated and then deposited to provide a web of generally uniform basis weight.

As used herein, "thermal point bonding" involves passing a fabric or web of fibers or other sheet layer material to be bonded between a heated calender roll and an anvil roll. The calender roll is usually, though not always, patterned on its surface in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a high density diamond or "HDD pattern", which includes point bonds having about 460 pins per square inch (about 71 pins per square centimeter) for a bond area of about 15% to about 23% and a wire weave pattern looking as the name suggests, e.g. like a window screen. Typically, the percent bonding area varies from around 10% to around 30% or more of the area of the fabric or web. Another known thermal calendering bonding method is the "pattern unbonded" or "point unbonded" or "PUB" bonding as taught in U.S. Pat. No. 5,858,515 to Stokes et al., wherein continuous bonded areas define a plurality of discrete unbonded areas. Thermal bonding (point bonding or point-unbonding) imparts integrity to individual layers by bonding fibers within the layer and/or for laminates of multiple layers, such thermal bonding holds the layers together to form a cohesive laminate material.

As used herein the term "monolithic" is used to mean "non-porous", therefore a monolithic film is a non-porous film. Rather than holes produced by a physical processing of the monolithic film, the film has passages with cross-sectional sizes on a molecular scale formed by a polymerization process. The passages serve as conduits by which water molecules (or other liquid molecules) can disseminate through the film. Vapor transmission occurs through a monolithic film as a result of a concentration gradient across the monolithic film. This process is referred to as activated diffusion. As water (or other liquid) evaporates on the body side of the film, the concentration of water vapor increases. The water vapor condenses and solubilizes on the surface of the body side of the film. As a liquid, the water molecules dissolve into the film. The water molecules then diffuse through the monolithic film and re-evaporate into the air on the side having a lower water vapor concentration.

As used herein, the term "microporous film" or "microporous filled film" means films which contain filler material which enables development or formation of micropores in the film during stretching or orientation of the film.

As used herein the term "filler" is meant to include particulates and other forms of materials that can be added to a film-forming polymer or blend of polymers and that will not chemically interfere with or adversely affect the extruded film but are able to be uniformly dispersed throughout the film. Generally, the fillers will be in particulate form and usually will have somewhat of a spherical shape with average particle sizes in the range of about 0.5 to about 8 microns. Generally, films utilizing a filler will usually contain about 30 percent to about 70 percent filler based upon the total weight of the film. Examples of fillers include calcium carbonate (CaCO3), various kinds of clay, silica (SiO2), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivative, polymer particles, chitin and chitin derivatives. The filler particles may optionally be coated with a fatty acid, such as stearic acid, which may facilitate the free flow of the particles (in bulk) and their ease of dispersion into the polymer matrix.

As used herein, the term "breathability" refers to the water vapor transmission rate (WVTR) of an area of fabric or material. Breathability is measured in grams of water per square meter per day (g/m2/24 hours). The WVTR of a material can be measured in accordance with ASTM Standard E96-80. Alternatively, for materials having WVTR greater than about 3000 g/m2/24 hours testing systems such as, for example, the PERMATRAN-W 100K water vapor permeation analysis system, commercially available from Modem Controls, Inc. (MOCON) of Minneapolis, Minn., may be used. Further, as used herein the term "breathable" refers to a fabric having a WVTR of at least 300 g/m2/24 hours.

As used herein, the term "film" refers to a thermoplastic film made using a film extrusion and/or other forming process, such as a cast film or blown film extrusion process. The term includes apertured films, slit films, and other porous or microporous films which constitute liquid/vapor/air transfer films, as well as barrier films which do not transfer liquid.

As used herein, the terms "blown film" or "film blowing" refer to a process for making a film in which a thermoplastic polymer or co-polymer is extruded to form a bubble filled with heated air or another hot gas in order to stretch the polymer. Then, the bubble is collapsed into a nip and collected.

As used herein, the term "thermoplastic" describes a material that softens when exposed to heat and which substantially returns to a nonsoftened condition when cooled to room temperature.

As used herein, the term "laminate" refers to a material made up of two or more layers of material.

As used herein, the term "cross-direction" refers to the width of a fabric or film in a direction generally perpendicular to the direction in which it is produced, as opposed to "machine direction" which refers to the length of a fabric or film in the direction in which it is produced.

DETAILED DESCRIPTION OF THE INVENTION

The present invention provides a process for forming cushioned film nonwoven laminates including one or more fibrous nonwoven webs and nascent blown film having first and second blown film layers defining therebetween a plurality of cushioning cells. In embodiments, the process provides for elastic laminates having cross machine direction stretch and recovery, elastic laminates having machine direction stretch and recovery, and elastic laminates having both machine direction and cross machine direction stretch and recovery. The invention will be described with reference to the following description and Figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

Turning to FIG. 1, there is depicted a schematic illustration of an embodiment of the process of the invention. As stated, the process forms laminates including blown film and one or more fibrous webs that are desirably nonwoven webs. As shown in FIG. 1, a process generally designated 6 includes a blown film bubble 10 of thermoplastic polymer composition, which may include elastic polymer, that is extruded from an extruder (not shown) and then blown from an annular die 8 with a gas 52 such as is known in the art for making blown films. The blown film bubble is directed to a collapsing nip 12 formed between first and second paired rollers 14 and 16. The collapsing nip 12 collapses the blown film bubble 10 by flattening it into a nascent film sheet. By "nascent", what is meant is that the flat film sheet is Just-formed, or freshly formed into the film sheet from the blown film bubble. In addition, if the film is still in a molten or partially molten state, and/or if the paired rollers 14 and 16 are heated rollers, the compressive forces at the nip 12 will cause the two sides of the film bubble 10 to adhere to one another, forming essentially a single nascent film sheet having a first film layer and a second film layer.

Figure 2:
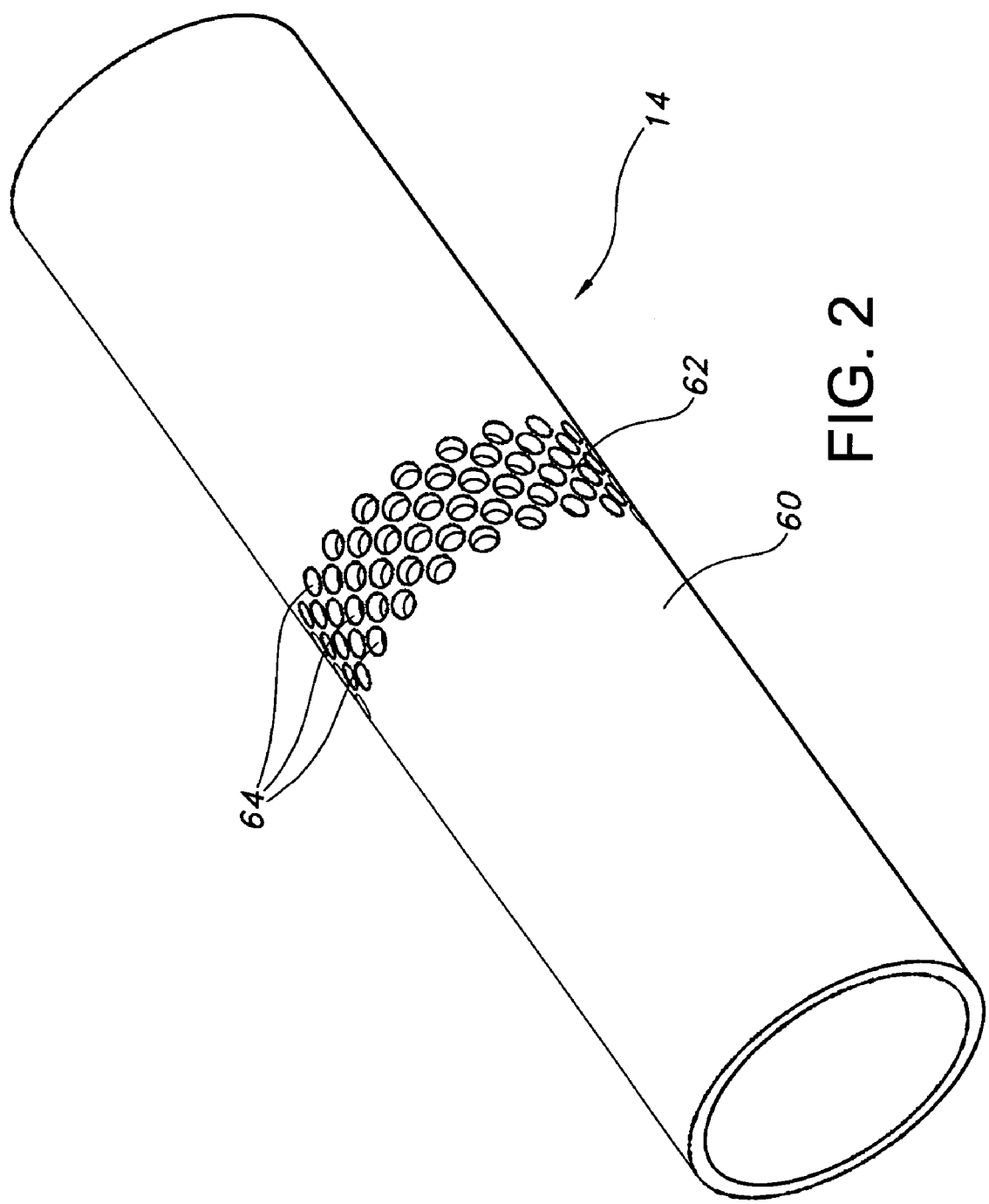
FIG. 2 depicts a perspective view of a cushion cell forming bond roller.

Referring to FIG. 2, the first roller 14 has an outer surface 60 including a continuous pattern of land areas 62 defining a plurality of discrete openings, apertures or holes 64. It should be understood that the plurality of openings, apertures or holes 64 may extend across the roll to cover the width of the film being laminated. The holes 64 may be fashioned in a variety of sizes, patterns and shapes, for example, round, rectangular, square, triangular, hexagonal, cross-shaped, doughnut-shaped, crescent-shaped, and so forth. Due to the openings 64 in the outer surface 60 of the first roller 14, the nip 12 only fully flattens the bubble 10 in the land areas 62. Each of the openings 64 in the first roller 14 defined by the continuous land areas 62 forms a discrete unbonded area in the laminate in which the layers of the film and the fibers or filaments of the web are substantially or completely unbonded. At the openings 64, the first layer of the film enters the openings as the film passes through the nip 12, thus creating a plurality of cushioning cells corresponding to the openings in the surface of the first roller defined between the first film layer and the second film layer. Advantageously, the second roller includes a smooth outer surface to enhance bonding between the layers in the area of the land areas 62.

Creation of the cushioning cells is further enhanced by application of a vacuum to the a portion of the plurality of discrete openings, apertures or holes 64. The vacuum may be applied to an internal manifold (not shown) that is in fluid communication with the openings 64. The vacuum serves to draw or pull the film layer into the opening to create a larger, more well-defined cushioning cell.

As noted above, gas 52 is blown into the film bubble to support the bubble. At the nip 12, the gas is entrained into the openings 64 in the outer surface 60 of the first roller 14 to create the cell between the first and second film layers. Creation of the cushioning cells is further enhanced when the gas pressure in the film bubble has an absolute pressure greater than an absolute pressure present in the plurality of discrete openings 64. The absolute pressure in the film bubble may be greater than the absolute pressure in the plurality of discrete openings, apertures or holes by between about 0.1 and about 5 psi, between about 0.2 and about 3 psi, or between about 0.3 and about 1 psi.

Returning to FIG. 1, a first fibrous nonwoven web 18 may be unwound from a supply roll 22 and the fibrous nonwoven web 18 is directed by a guide roller 26 to the collapsing nip 12 to contact a side surface of and be laminated to the nascent film sheet as the film sheet is collapsed from the bubble 10. In this regard, the collapsing nip 12 also serves as a laminating nip. Where the film is still in a molten or partially molten state, and/or if the paired rollers 14 and 16 are heated rollers, the compressive forces at the nip 12 may cause the fibrous nonwoven web 18 to adhere directly to the film surface, bonding the film and the nonwoven web 18 together into a bi-laminate or bilayer material. On the other hand, where the film is not still in at least a partially molten state or where additional lamination bond strength is desired, an optional adhesive applicator 30 may be used to coat the surface or part of the surface of the fibrous nonwoven web 18 with an adhesive composition. The adhesive applicator 30 may be any suitable device as is known in the art, such as for example a melt spray adhesive applicator or a slot coat adhesive applicator. It is also contemplated that coextruded skin layers may be used to enhance bonding between the two layers of blown film or between the blown film and the fibrous nonwoven web. For example, a skin layer on the inner surface of the blown film bubble could advantageously be used to enhance bonding between the film layers as they are nipped together at nip 160. As another example, a skin layer on the outer surface of the blown film bubble could advantageously be used to enhance bonding between the film and the fibrous nonwoven.

In one embodiment, it may be desirable to form only the cushioned film with no fibrous web present. In this embodiment, the film having cushioning cells includes a first nascent blown film layer, a second nascent blown film layer, and a plurality of cushioning cells defined between the first film layer and the second film layer. The cushioned film may be wound on a roll as described for the film nonwoven laminate and suitably used in a variety of applications including those for which the film nonwoven laminate is suitable. For example, the cushioned film may be suitable for use as a packing material for protection of fragile items.

After the fibrous nonwoven web 18 and the nascent film sheet have been formed into a laminate at the collapsing nip 12, the laminate material 34 is directed by a guide roller 36 to a winding roll 38 to be wound up for storage. Alternatively, the laminate material 34 may be directed to various converting or product forming operations without being wound and stored in roll form.

In another embodiment, it may be desirable to form a tri-laminate or trilayer material including a fibrous nonwoven web on each side of the elastic nascent film sheet. Continuing with FIG. 1, there is also shown the embodiment where a second fibrous nonwoven web 20 is unwound from a supply roll 24 and the second fibrous nonwoven web 20 is directed by a second guide roller 28 to the collapsing/lamination nip 12 to contact the side surface of the nascent film sheet opposite the side to which the first fibrous nonwoven web 18 was laminated. As mentioned above, if the film is not still in at least a partially molten state when the fibrous nonwoven webs are laminated to it or where additional lamination bond strength is desired, a second optional adhesive applicator 32 may be used to coat the surface or part of the surface of the second fibrous nonwoven web 20 with an adhesive composition.

Such fibrous webs as are selected for use in the laminate may be any fibrous layer, such as nonwoven web materials, textile materials or knitted materials. Desirably, the fibrous web may be capable of extension in at least one direction. In one embodiment, the fibrous web may be capable of extension in the cross-direction. For ease and speed of production and due to their relatively low cost, nonwoven web materials are highly suitable for use in forming the laminate. Such fibrous nonwoven webs include, for example, spunbond webs, meltblown webs and carded webs. As stated, the fibrous nonwoven web selected is desirably capable of extension in at least one direction in an amount not less than the desired ability of the laminate material to stretch and recover.

Particularly with respect to the embodiment depicted in FIG. 1, the fibrous nonwoven webs should have at least some amount of extensibility in the cross machine direction. If it is desired that the fibrous nonwoven web or webs supplied on the supply rolls 22 or 24 have greater than as-supplied extensibility prior to lamination at the collapsing nip 12, the optional incremental stretching nips 40 and 46 formed between paired grooved rollers 42, 44 and 48, 50 respectively, may be advantageously employed to impart a cross machine direction incremental extension to one or both of fibrous nonwoven webs 18 or 20. Grooved rollers for incremental stretching are well known in the art and will not be described herein in detail. Briefly, grooved rollers may be constructed from a series of spaced disks or rings mounted on a mandrel or axle, or may be a series of spaced circumferential peaks and grooves cut into the surface of a roller. A pair of matched grooved rollers are then brought together with the peaks of one roller fitting into the grooves of the other roller, and vice versa, to form a "nip", although it should be noted that there is no requirement for actual compressive contact as is the case for typical nipped rollers.

A sheet material passed through such a roller arrangement is incrementally stretched or extended in the cross machine direction. After the material passes out of the grooved roller arrangement, if the material does not retract sufficiently or to the desired amount toward its original cross machine direction dimension or width, a machine direction drawing tension may be applied to cause it to further retract. Then, when the retracted material is laminated to the elastic film, it will be capable of cross machine direction extension approximately at least to the extent of the applied incremental stretching. When it is desired to incrementally stretch the fibrous nonwoven web or webs it may also be desired to apply heat to the webs just prior to the application of incremental stretch in order to cause the webs to relax somewhat and permit extension more easily. Heat may be applied to the webs by any suitable means as are known in the art such as for example heated air, infrared heaters, heated nipped rollers, or partial wrapping of the web around one or more heated rollers or steam canisters, etc. In addition, or alternatively, it may be desirable to apply heat to the grooved rollers themselves.

Polymers suitable for making the fibrous nonwoven webs to be used in the embodiments of the process described herein include those polymers known to be generally suitable for making nonwoven webs such as spunbond, meltblown, carded webs and the like, and include for example polyolefins, polyesters, polyamides, polycarbonates and copolymers and blends thereof. It should be noted that the polymer or polymers may desirably contain other additives such as processing aids or treatment compositions to impart desired properties to the fibers, residual amounts of solvents, pigments or colorants and the like.

Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include poly(lactide) and poly(lactic acid) polymers as well as polyethylene terephthalate, polybutylene terephthalate, polytetramethylene terephthalate, polycyclohexylene-1,4-dimethylene terephthalate, and isophthalate copolymers thereof, as well as blends thereof.

Fibrous nonwoven webs formed from non-elastic polymers such as, for example, polyolefins are generally considered non-elastic, and also may not have desirable levels of extensibility. As mentioned above, low extensibility of the nonwoven web or webs may cause the resulting laminate material to be too restricted in its elastic properties. Therefore, care should be taken to use a fibrous nonwoven web which is at least somewhat extensible in the direction of desired stretch and recovery. As an example, carded webs of staple fibers as are known in the art are generally known to have considerably greater fiber orientation in the machine direction than in the cross machine direction. Because more of the fibers are aligned in the machine direction, the carded web tends to have more natural extensibility in the cross machine direction than in the machine direction. In addition, utilizing low basis weights for a fibrous nonwoven web selected for use in the process may allow for greater extensibility, whether such nonwoven web layer is a spunbond web, a meltblown web, a carded web, etc.

Where the fibrous nonwoven web or webs selected for use do not have sufficient cross machine direction extensibility, and where it is not desired to utilize an incremental stretching apparatus as was described in FIG. 1, the fibrous nonwoven web or webs may be supplied as "necked" nonwoven webs. A "necked" nonwoven web is one that has been elongated in one direction, usually the machine direction, causing rugosities to form across the web and, generally, causing the web to decrease its cross machine direction dimension. When such a necked nonwoven web is joined to the elastic film while the nonwoven web is in the necked or elongated condition, the nonwoven web (and the resulting laminate) can then be extended in the direction perpendicular to the direction of necking. As an alternative to supplying the fibrous nonwoven web as a roll of previously necked material, it is also acceptable to neck the material during the lamination process by driving the collapsing nip rollers 14 and 16 at a linear velocity which is greater than the rate at which the material is unwound from the supply roll 22 and/or 24. When necking during the process, it may be desirable to also utilize the optional nonwoven web heating means as were described above with respect to incremental stretching or grooved rolling. Necking of web materials is disclosed for example by U.S. Pat. Nos. 5,336,545, 5,226,992, 4,981,747 and 4,965,122 to Morman, all incorporated herein by reference in their entireties.

In addition, initial bonding of a fibrous nonwoven web (i.e., bonding to consolidate the nonwoven web itself rather than lamination bonding of a nonwoven web to the film sheet) may be performed by any method known to be suitable for bonding such nonwoven webs, such as for example by thermally point-bonding or spot-bonding the nonwoven web as described above. Alternatively, where the fibers are multi-component fibers having component polymers with differing melting points, through-air bonders such as are well known to those skilled in the art may be advantageously utilized. Generally speaking, a through-air bonder directs a stream of heated air through the web of multicomponent fibers thereby forming inter-fiber bonds by desirably utilizing heated air having a temperature at or above the polymer melting temperature of a lower melting polymer component and below the melting temperature of a higher melting polymer component. As still other alternatives, a fibrous nonwoven web may be bonded by utilizing other means as are known in the art such as for example adhesive bonding, ultrasonic bonding or entanglement bonding such as hydroentangling or needling.

While the type of initial bonding utilized for a fibrous nonwoven web is not critical, where it is desired that the nonwoven have cross machine direction extensibility without being necked, it may be advantageous to use the least amount of bonding which allows for the nonwoven web to be transported to a point in the process where it is laminated with the nascent film sheet. As an example, the nonwoven web may be bonded with a point bonding method having a low percentage of bonded area. As another example, a nonwoven web may be very lightly consolidated by such as an air knife blowing heated air into and through the web of fibers, such as for example the hot air knife or "HAK" described in U.S. Pat. No. 5,707,468 to Arnold, et al., incorporated herein by reference in its entirety.

As still another example, the nonwoven web may be bonded with a point bonding method wherein the arrangement of the bond elements or bonding "pins" are arranged such that the pin elements have a greater dimension in the machine direction than in the cross-machine direction. Linear or rectangular-shaped pin elements with the major axis aligned substantially in the machine direction are examples of this. Alternatively, or in addition, useful bonding patterns may have pin elements arranged so as to leave machine direction running "lanes" or lines of unbonded or substantially unbonded regions running in the machine direction, so that the nonwoven web material has additional give or extensibility in the cross machine direction. Such bonding patterns as are described in U.S. Pat. No. 5,620,779 to Levy and McCormack, incorporated herein by reference in its entirety, may be useful, and in particular the "rib-knit" bonding pattern therein described.

The characteristics or physical properties of fibrous nonwoven webs are controlled, at least in part, by the density or openness of the fabric. Generally speaking, fibrous nonwoven webs made from crimped filaments or fibers have a lower density, higher loft and improved resiliency compared to similar nonwoven webs of uncrimped filaments. Such a lofty, low density fibrous nonwoven web layer may be particularly desirable for use in skin-contacting applications to provide a more cloth-like texture to the elastic laminate.

In addition, crimped fibers may also assist the extensibility of the fibrous nonwoven web or webs. Those crimped fibers in the nonwoven web which have a primary orientation in the direction of desired extensibility (or those portions of the fibers having primary orientation in the direction of desired extensibility) may be allowed to "give" or extend somewhat more via a straightening out of the crimps in the fibers. Various methods of crimping melt-spun multicomponent filaments are known in the art. As disclosed in U.S. Pat. Nos. 3,595,731 and 3,423,266 to Davies et al., incorporated herein by reference in their entireties, bicomponent fibers or filaments may be mechanically crimped and the resultant fibers formed into a nonwoven web or, if the appropriate polymers are used, a latent helical crimp produced in bicomponent fibers or filaments may be activated by heat treatment of the formed web. Alternatively, as disclosed in U.S. Pat. No. 5,382,400 to Pike et al., incorporated herein by reference in its entirety, the heat treatment may be used to activate the latent helical crimp in the fibers or filaments before the fibers or filaments have been formed into a nonwoven web. As an alternative to bicomponent fibers, fiber crimp may be produced in homofilament fibers (fibers having one polymer component) by utilizing the teachings disclosed in U.S. Pat. No. 6,632,386 to Shelley and Brown, U.S. Pat. No. 6,446,691 to Maldonado et al. and U.S. Pat. No. 6,619,947 to Pike et al., all incorporated herein by reference in their entireties.

Generally speaking, the basis weight of the fibrous nonwoven web or webs may suitably be from about 7 gsm or less up to 100 gsm or more, and more particularly may have a basis weight from about 10 gsm or less to about 68 gsm, and still more particularly, from about 14 gsm to about 34 gsm. Other examples are possible.

It should further be noted that either or both of the fibrous nonwoven webs provided to the laminate may themselves be multi-layer structures. Particular examples of multilayer laminate construction for the fibrous nonwoven web or webs includes spunbond-meltblown-spunbond laminates such as are described in U.S. Pat. Nos. 4,041,203 and 4,766,029 to Brock et al., U.S. Pat. No. 5,464,688 to Timmons et al. and U.S. Pat. No. 5,169,706 to Collier et al., all of which are incorporated herein by reference in their entireties. As another example, where a spunbond fibrous nonwoven web is selected for use in the film nonwoven laminate, the spunbond web itself may be produced on a multiple spin bank machine where a subsequent spin bank deposits fibers atop a layer of just-deposited fibers from a previous spin bank, and so in this regard such an individual spunbond nonwoven web may be thought of as a multi-layered structure. In this situation, the various layers of deposited fibers in the fibrous nonwoven web may be the same, or they may be different in basis weight and/or in terms of the composition, type, size, level of crimp, and/or shape of the fibers produced. As another example, a single fibrous nonwoven web may be provided as two or more individually produced layers of a spunbond web, a carded web, etc. which have been bonded together to form the fibrous nonwoven web, and these individually produced layers may differ in terms of production method, basis weight, composition, and fibers as discussed above.

As stated above, the film sheet is desirably extruded as a blown film, though it may be possible to use two layers of a cast film as well. Blown films are well known in the art and will not be discussed herein in detail. Briefly, the production of a blown film involves use of a gas, such as air, to expand a bubble of molten extruded polymer after the molten polymer has been extruded from an annular die. Processes for producing blown films are taught in, for example, U.S. Pat. No. 3,354,506 to Raley, U.S. Pat. No. 3,650,649 to Schippers and U.S. Pat. No. 3,801,429 to Schrenk et al., all incorporated herein by reference in their entireties. It should be noted that the blow up ratio (the ratio of the circumference of the blown up film to the circumference of the inner circle of the film die) can be controlled by the amount of polymer extruded and by the amount of gas used to expand the bubble. By controlling the blow up ratio to match the width of the collapsed film sheet to the width of the available fibrous nonwoven web to be laminated, overlaps of one material past the width extent of the other, and thus associated trim waste, can be sharply reduced or even virtually eliminated. In addition, or alternatively, the width of the collapsed film sheet may be matched to suit both the available fibrous nonwoven web and the desired width of elastic laminate material which is to be used in a final product configuration, thereby reducing the waste that often occurs when the elastic laminate itself must be trimmed to fit in the final product.

In general, the film sheet in the final nonwoven-film laminate material may have a basis weight of from about 5 gsm or less to about 100 gsm or greater. More desirably, the elastic film sheet may have a basis weight from about 5 gsm to about 68 gsm, and still more desirably from about 5 gsm to about 34 gsm. The film sheet is desirably an elastic film sheet. Because elastic materials are often expensive to produce, the elastic film sheet is desirably of as low basis weight as is possible while still providing the desired properties of stretch and recovery to the elastic laminate material.

Many polymers are known to be suitable for forming fibers, foams and films. Thermoplastic polymer compositions useful for forming the blown film may desirably include any polymer or polymers known to be suitable fiber or film forming resins including, for example, polyolefins such as polypropylene, polyethylene, polybutylene, and so forth, polyamides, polyesters, and so forth. Thermoplastic polymer compositions useful for forming an elastic blown film may desirably include any elastic polymer or polymers known to be suitable elastomeric fiber or film forming resins including, for example, elastic polyesters, elastic polyurethanes, elastic polyamides, elastic co-polymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and where B is an elastomeric polymer midblock such as a conjugated diene or a lower alkene polymer such as for example polystyrene-poly (ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly(ethylene-propylene) or SEPSEP block copolymer. These A-B-A' and A-B-A-B copolymers are available in several different formulations from the Kraton Polymers of Houston, Tex. under the trade designation KRATON®. Other commercially available block copolymers include the SEPS or styrene-poly(ethylene-propylene)-styrene elastic copolymer available from Kuraray Company, Ltd. of Okayama, Japan, under the trade name SEPTON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from Exxon of Houston, Tex., as well as blends.

Film layers or sheets, including elastic film layers, generally act as a barrier to the passage of liquids, vapors and gases. In particular, it is desirable that the film be impermeable to the gas contained in the cells defined between the film layers, thus preventing unintended deflation of the cushioning cells.

It may be desirable to provide breathability to the laminate in the portions of the laminate other than the cushioning cells in circumstances where barrier properties are not particularly important or not desired. In such circumstances, either the elastic film sheet itself or the entire elastic laminate may be apertured or perforated in the bonded land areas to provide a laminate capable of allowing the passage of vapors or gases. Such perforations or apertures may be performed by methods known in the art such as for example slit aperturing or pin aperturing with heated or ambient temperature pins. Care must be taken to provide aperturing only in those areas of the laminate that are not cushioning cells. In one embodiment, pins may be provided on the roller opposite the roller with the openings, taking care to register the pin pattern with the land areas in the opposing roller to avoid the cushioning cells.

Figure 3:
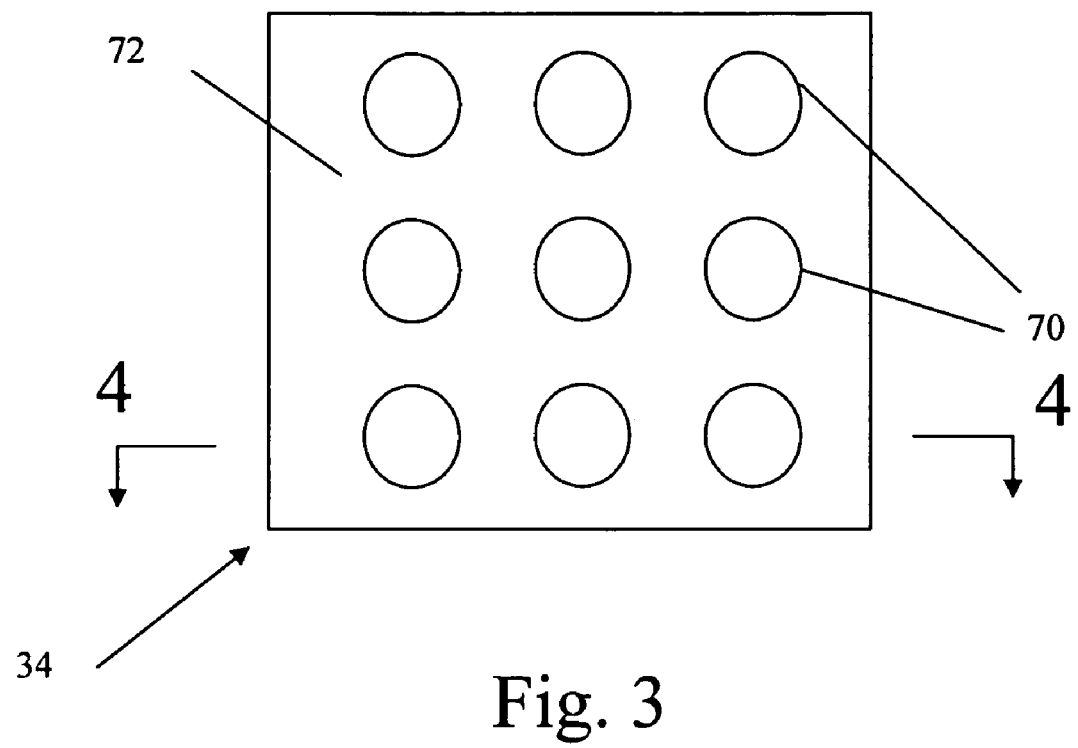
FIG. 3 depicts a bottom elevation view of the film nonwoven laminate of the present invention.
Figure 4:
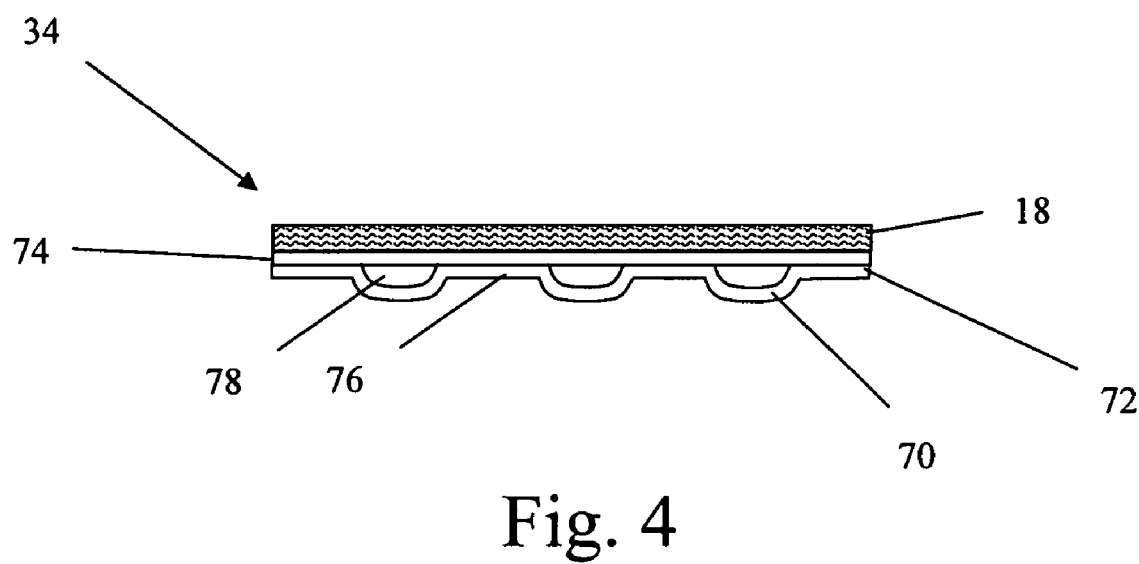
FIG. 4 is a cross-sectional side view of the film nonwoven laminate of FIG. 3 taken along line 4-4.

Referring to FIGS. 3 and 4, an embodiment of a film nonwoven laminate material 34 is illustrated having cushioning cells 70 with an internal gas volume 78 defined between a first blown film layer 72 and a second blown film layer 74. The blown film layers 72, 74 are bonded together in the continuous bonded region 76 between the cushioning cells 70. Desirably, the internal gas volume 78 of the individual discrete cushioning cells 70 is about 0.0001 to 1.0 cubic centimeters. More desirably, the internal gas volume 78 of the discrete cushioning cells 70 is about 0.001 to about 0.1 cubic centimeters. The cushioning cells 70 may have a variety of sizes, patterns and shapes, for example, round, rectangular, square, triangular, hexagonal, cross-shaped, doughnut-shaped, crescent-shaped, and so forth. When round cushioning cells are used, they may have diameters ranging from about 0.1 to about 5 centimeters, about 0.2 to about 2 centimeters, or about 0.3 to about 1 centimeter. In one embodiment, cushioned film has a plurality of round (0.5 centimeters diameter) cushioning cells spaced about 1.0 centimeters apart in rows extending across the cross direction of the film. The adjacent rows of cushioning cells are spaced about 1.0 centimeters apart and offset from the adjacent row by about 0.5 centimeters.

The area of the bonded region 76 may range from about 10% to about 90% of the total area, from about 20% to about 80% of the total area, or from about 25% to about 50% of the total area. The second blown film layer 74 is bonded to a nonwoven web material 18. Either the first blown film layer 72 or the second blown film layer 74 may have an additional skin layer (not shown) to enhance bonding of the film layers to each other or to the nonwoven web material 18. For example, a skin layer may be used on the second blown film layer 74 between the second blown film layer and the nonwoven web material 18. As another example, a skin layer may coextruded between the first and second blown film layers 72, 74.

Figure 5:
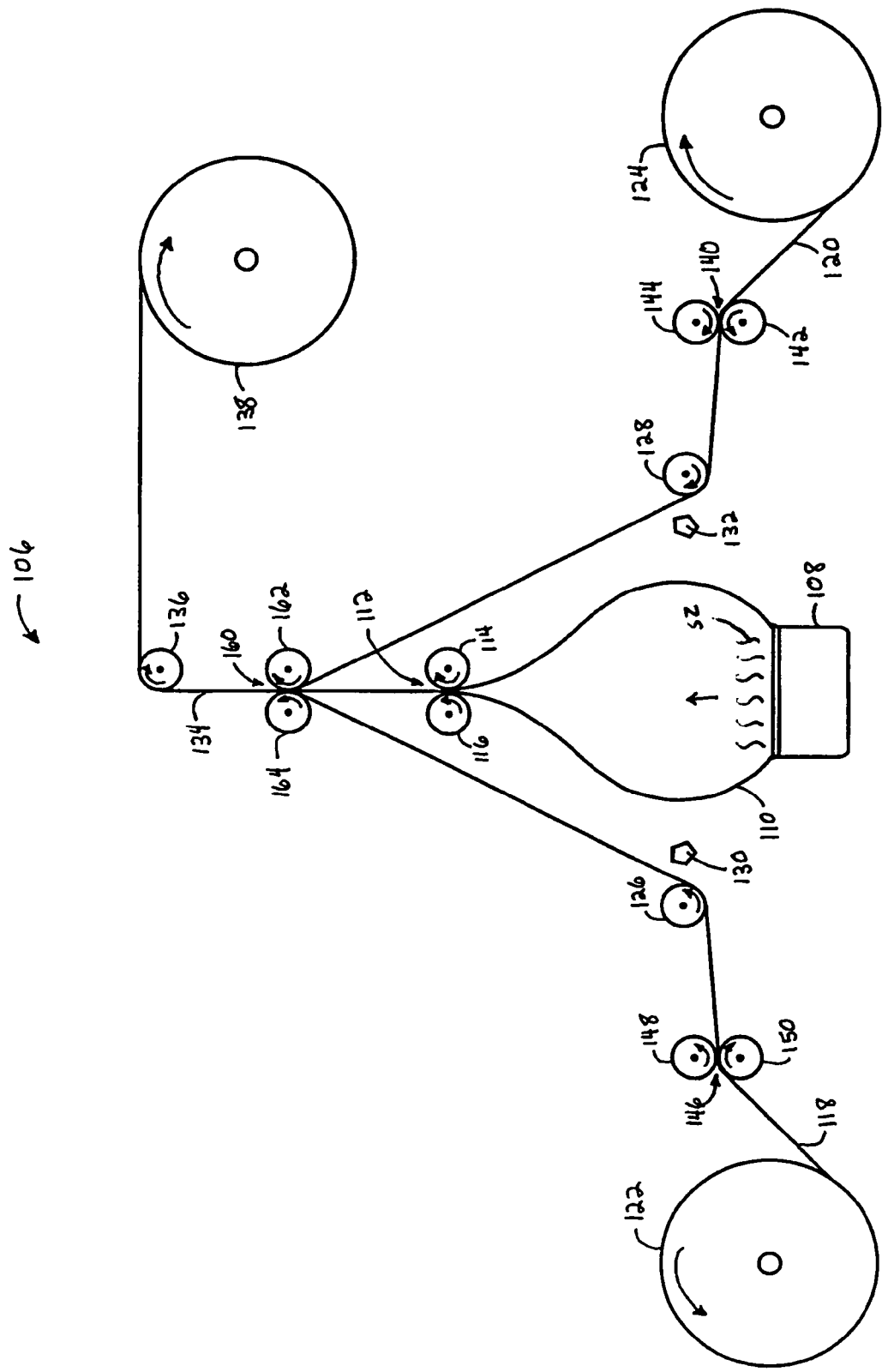
FIG. 5 schematically illustrates a process for forming elastic film nonwoven web laminates according to another embodiment of the invention.

Turning to FIG. 5, there is shown schematically illustrated another embodiment of the process of the invention which is capable of producing bilayer or trilayer nonwoven/blown film elastic laminates having either cross machine direction elastic properties or machine direction elastic properties, or cross machine direction and machine direction elastic properties. The embodiment of the process in FIG. 5, generally designated 106, is very similar to the embodiment illustrated in FIG.1, except that the process 106 is capable, if desired, of directing the fibrous nonwoven web or webs along different paths than in FIG. 1, resulting in first contact of the fibrous nonwoven web or webs to the side or sides of the elastic film sheet at a point in the process after the collapsed film sheet has exited the collapsing nip 112. However, if desired, the process illustrated in FIG. 5 may be utilized to make a cross machine direction extensible elastic laminate material as was discussed above with respect to FIG. 1. That is, one or both fibrous nonwoven webs 118,120 may be unwound from supply rolls 122,124 and guided around guide rollers 126, 128 to be laminated to the side or sides of the nascent film sheet at collapsing nip 112 defined between rollers 114,116 as the blown film bubble 110 is collapsed in collapsing nip 112.

However, the process 106 may also be utilized to form machine direction extensible elastic laminate materials. When it is desired to make elastic laminates having machine direction stretch and recovery, the first fibrous nonwoven web 118 and/or second fibrous nonwoven web 120 may be directed past the collapsing nip 112 to be laminated to the elastic film sheet at a second nip 160 formed between rollers 162 and 164. Rollers 114 and 116 are driven at a first velocity, and rollers 162 and 164 are driven at a second velocity. When the second velocity is greater than the first velocity, the collapsed elastic film sheet will experience a machine direction tension force as it travels through collapsing nip 112 and second nip 160.

This machine direction tension force will cause the elastic film sheet to be stretched or elongated in the machine direction. Because the film sheet is elastic, when the tension is removed or relaxed the film will retract toward its original machine direction length. When the film retracts or becomes shorter in the machine direction, first fibrous nonwoven web 118 and/or second fibrous nonwoven web 120 which are bonded to the side or sides of the elastic film will buckle or form gathers. The resulting elastic laminate material is stretchable in the machine direction to the extent that the gathers or buckles in the fibrous nonwoven web or webs can be pulled back out flat and allow the elastic film to elongate. The elastic laminate material 134 is then directed around guide roller 136 to winding roll 138 to be wound up for storage, or may instead be directed to various converting or product forming operations without being wound and stored in roll form. It should be noted that where it is desired to produce an elastic laminate material having only machine direction stretch and recovery that no particular care need be exercised with respect to selecting or producing web materials having cross machine direction extensibility.

In addition, the process depicted in FIG. 5 may be used to produce elastic laminate materials having both machine direction and cross machine direction stretch and recovery properties. When the first and/or second fibrous nonwoven webs supplied to the process are inherently extensible in the cross machine direction or treated to become more extensible in the cross machine direction, the resulting laminate will have the machine direction stretch via the gathering technique described immediately above and have cross machine direction stretch due to the cross machine direction extensibility of the nonwoven webs. As was described with respect to FIG. 1, the fibrous nonwoven web or webs may be provided as rolls of previously necked material, or may be necked in-line via a machine direction drawing tension supplied by nip 160 where rollers 162 and 164 are driven at a linear velocity greater than the rate at which the nonwoven web or webs are unwound from the supply rolls. Also as was described with respect to FIG. 1, the process 106 in FIG. 5 may optionally include incremental stretching nips 140 and 146 formed between paired grooved rollers 142, 144 and 148,150 respectively, which may be used to impart a cross machine direction incremental extension to one or both of fibrous nonwoven webs 118 or 120. For either in-line necking or in-line incremental stretching, it may further be desired to supply heat to the fibrous nonwoven webs to relax the web and assist in necking or incremental stretching, as was described above.

The process shown in FIG. 5 further includes adhesive applicators 130 and 132 that may be used to coat the surface or part of the surface of the first fibrous nonwoven web 118 and/or second fibrous nonwoven web 120 with an adhesive composition to assist with bonding lamination of the fibrous web or webs to the elastic film sheet. As described above, adhesive applicators 130 and 132 may be any suitable devices as are known in the art, such as for example a melt spray adhesive applicator or a slot coat adhesive applicator. Alternatively, the fibrous nonwoven web or webs may be laminate bonded to the elastic film sheet by utilizing heated rolls 162, 164 at nip 160, and/or by using additional heated pattern engraved or point bonding means as are known in the art. It is also contemplated that coextruded skin layers may be used to enhance bonding between the two layers of blown film or between the blown film and the fibrous nonwoven web. For example, a skin layer on the inner surface of the blown film bubble could advantageously be used to enhance bonding between the film layers as they are nipped together at nip 160. As another example, a skin layer on the outer surface of the blown film bubble could advantageously be used to enhance bonding between the film and the fibrous nonwoven.

While not shown here, various additional potential processing and/or finishing steps known in the art such as slitting, treating, aperturing, printing graphics, or further lamination of the elastic laminate into a composite with other materials, such as other films or other nonwoven layers, may be performed without departing from the spirit and scope of the invention. General examples of web material treatments include electret treatment to induce a permanent electrostatic charge in the web, or in the alternative antistatic treatments, or one or more treatments to impart wettability or hydrophilicity to a web including hydrophobic thermoplastic material. Wettability treatment additives may be incorporated into the polymer melt as an internal treatment, or may be added topically at some point following fiber or web formation. Still another example of web treatment includes treatment to impart repellency to low surface energy liquids such as alcohols, aldehydes and ketones. Examples of such liquid repellency treatments include fluorocarbon compounds added to the web or fibers of the web either topically or by adding the fluorocarbon compounds internally to the thermoplastic melt from which the fibers are extruded.

As another example of an additional processing or finishing step, the laminate material itself may be subjected to stretching in either the machine direction or cross machine direction, or both, such as by machine direction tensioning, tenter frames, or grooved rolling, in order to impart additional levels of extensibility. As still another example, it may be desirable to add a temperature controlled section to the process embodiments described above, at some point in the process after the film bubble is collapsed and/or after the fibrous nonwoven web(s) are laminated to the elastic film, to retract and/or heat anneal and/or chill the laminate material to help control and set a desired level of retraction in the finished laminate.

As another example of an alternative embodiment, the fibrous nonwoven web or webs need not necessarily be supplied to the elastic laminate formation process as previously produced and roll-wound webs. Instead, the fibrous nonwoven web or webs may be produced at an adjacent spunbonding, meltblowing or carding operation and directed immediately as a just-produced fibrous nonwoven web for lamination into the laminate material production process. As another example, although the fibrous nonwoven webs were described herein as webs produced from non-elastic polymers, this is not required, and suitable fibrous nonwoven webs may also be produced using one or more elastic polymers, and/or blends of elastic and non-elastic polymers.

The elastic laminates formed by the process embodiments described herein are highly suited for use in medical care products, protective wear garments, mortuary and veterinary products, and personal care products. Examples of such products include, but are not limited to, medical and health care products such as surgical drapes, gowns and bandages, protective workwear garments such as coveralls and lab coats, and infant, child and adult personal care absorbent products such as diapers, training pants, incontinence garments and pads, sanitary napkins, wipes and the like.

EXAMPLE

As a specific example of an embodiment of the foregoing process for producing elastic laminates, a bi-layer elastic laminate having cushioning cells and cross machine direction stretch and recovery was produced in the following manner. The fibrous nonwoven webs were necked polypropylene spunbond having a basis weight of about 34 gsm in the necked conformation and be supplied on rolls to a process such as the one depicted in FIG. 1. The fibrous nonwoven webs were polypropylene spunbond nonwoven webs that were then necked by stretching in the machine direction substantially in accordance with the teachings of necked webs as in U.S. Pat. Nos. 5,336,545, 5,226,992, 4,981,747 or 4,965,122 to Morman, and rolled up on rolls to be unwound during the lamination process. The fibrous nonwoven webs were supplied as about 19 inch wide (about 48.3 centimeters) wide spunbond webs to make an elastic laminate having a width of about 19 inches (about 48.3 centimeters).

The elastic film was blown from a polyolefin plastomer (available as AFFINITY 1950 available from Dow Chemical Company of Midland, Mich.) on a conventional blown film line (available as Killion Blown Film line in dedicated configuration (polymer extruder, 3 inch (7.62 centimeter) diameter annular film die, and blowing apparatus) available from Davis-Standard of Pawcatuck, Conn.). The elastic polymer composition or elastic polymer blend composition was heated to about 200° C. and extruded to the annular film die at a rate of about 175 pounds per hour (about 79.4 kilograms per hour). The molten elastic film composition extruded from the annular die was blown by supplying air at ambient temperatures in order to blow the film bubble up to a blow up ratio of about 4 before collapsing the film bubble. The film bubble was then collapsed in a collapsing nip to form a nascent film sheet having a width of about 19 inches (about 48.3 centimeters) and a basis weight of approximately 30 gsm. The outer surface of one roller in the collapsing nip defined a plurality of round (0.5 centimeters diameter) openings spaced 1.0 centimeters apart in rows extending across the cross direction of the roller. The adjacent rows were spaced 1.0 centimeters apart and offset from the adjacent row by 0.5 centimeters. The outer surface of the second roller in the collapsing nip had a smooth surface.

The fibrous nonwoven web was unwound from a supply roll at a rate of about 300 feet per minute (about 91.4 meters per minute) and fed into the collapsing nip as the blown film bubble entered the collapsing nip such that the nonwoven web was pressed between the smooth roller and the nascent film sheet to form a bi-laminate material. Thereafter, the cross machine direction elastic laminate material was taken up on a winding roll. A sample of such a cross machine direction elastic laminate was found to be capable of being extended in the cross machine direction to about 133% of its width, and after release of extension tension recovered or retracted to at least about 50% of the amount of the extension.

While various patents have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A process for forming a film nonwoven laminate having cushioning cells comprising:
   extruding a thermoplastic film-forming polymer composition; blowing the extruded thermoplastic polymer composition to form a blown film bubble; directing the bubble to a nip formed between a first roller and a second roller, wherein the first roller has an outer surface comprising a continuous pattern of land areas defining a plurality of discrete openings, apertures or holes, and wherein the first and second rollers partially collapse the bubble into a nascent film sheet comprising a first film layer, a second film layer, and a plurality of cushioning cells defined between the first film layer and the second film layer; providing a fibrous nonwoven web in a necked condition; and directing the fibrous nonwoven web between the second roller and the nascent film to form a laminate comprising the nascent film and the fibrous nonwoven web, wherein the first and second film layers are elastic.

2. The process of claim 1 wherein the second roller comprises a smooth outer surface.

3. The process of claim 1 further comprising the step of applying a vacuum to the plurality of discrete openings, apertures or holes.

4. The process of claim 1 wherein gas is brown into the blown film bubble to support the bubble.

5. The process of claim 4 further comprising the step of entraining the gas into the cushioning cells.

6. The process of claim 4 further comprising the step of applying a vacuum to the plurality of discrete openings, apertures or holes.

7. The process of claim 6 wherein the plurality of discrete opening, apertures or holes are in fluid communication with a manifold from which the vacuum is drawn.

8. The process of claim 6 wherein the air in the film bubble has an absolute pressure greater than an absolute pressure in the plurality of discrete openings, apertures or holes.

9. The process of claim 8 wherein the absolute pressure in the film bubble is greater than the absolute pressure in the plurality of discrete openings, apertures or holes by between about 0.1 and about 5 psi.

10. The process of claim 1 wherein the cushioning cells are discrete cushioning cells having an internal gas volume of about 0.0001 to 1.0 cubic centimeters.

11. The process of claim 1 wherein the cushioning cells are discrete cushioning cells having an internal gas volume of about 0.001 to about 0.1 cubic centimeters.

12. The process of claim 1 further comprising the step of applying an adhesive to the fibrous nonwoven web prior to directing the fibrous nonwoven web between the second roller and the nascent film.

13. The process of claim 1 wherein the nip is a heated nip.

* * * * *